United States Patent
Roth

(10) Patent No.: US 9,327,724 B2
(45) Date of Patent: May 3, 2016

(54) SEPARATION CONTROLLER FOR MOTOR VEHICLES

(71) Applicant: Simon Roth, Ludwigsburg (DE)

(72) Inventor: Simon Roth, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/334,111

(22) Filed: Jul. 17, 2014

(65) Prior Publication Data

US 2015/0025706 A1    Jan. 22, 2015

(30) Foreign Application Priority Data

Jul. 22, 2013   (DE) .......................... 10 2013 214 308

(51) Int. Cl.
 *B60W 30/00*  (2006.01)
 *B60W 30/16*  (2012.01)

(52) U.S. Cl.
 CPC ............... *B60W 30/00* (2013.01); *B60W 30/16* (2013.01); *B60W 2550/30* (2013.01); *B60W 2750/30* (2013.01)

(58) Field of Classification Search
 CPC ... B60T 8/17557; B60W 30/00; B60W 30/10; B60W 30/12; B60W 30/14; B60W 30/16; B60W 30/143; B60W 30/18163; B60W 30/182; B60W 2550/30; B60W 2750/30; G05B 19/4061; G08G 1/16; G08G 1/161; G08G 1/162; G08G 1/163; G08G 1/167; G08G 1/176
 See application file for complete search history.

(56) References Cited

U.S. PATENT DOCUMENTS

| | | | | |
|---|---|---|---|---|
| 5,521,579 | A * | 5/1996 | Bernhard | 340/438 |
| 7,206,686 | B2 * | 4/2007 | Sawamoto | B60K 31/0008 180/170 |
| 8,219,298 | B2 * | 7/2012 | Nishira et al. | 701/96 |
| 8,244,408 | B2 * | 8/2012 | Lee et al. | 700/301 |
| 2002/0017413 | A1 * | 2/2002 | Ochiai et al. | 180/178 |
| 2003/0173127 | A1 * | 9/2003 | Noecker | 180/167 |
| 2004/0238249 | A1 * | 12/2004 | Kim | 180/169 |
| 2005/0187713 | A1 * | 8/2005 | Yamamura et al. | 701/301 |
| 2007/0024429 | A1 * | 2/2007 | Song | 340/435 |
| 2008/0185207 | A1 * | 8/2008 | Kondoh | B60W 30/16 180/272 |
| 2010/0299043 | A1 * | 11/2010 | Dorenkamp et al. | 701/96 |
| 2012/0109421 | A1 * | 5/2012 | Scarola | 701/2 |
| 2012/0268260 | A1 * | 10/2012 | Miller et al. | 340/435 |
| 2012/0316730 | A1 * | 12/2012 | Zhang et al. | 701/41 |
| 2012/0330528 | A1 * | 12/2012 | Schwindt et al. | 701/96 |
| 2014/0136015 | A1 * | 5/2014 | Hayakawa et al. | 701/1 |
| 2015/0006028 | A1 * | 1/2015 | Strauss | 701/36 |

* cited by examiner

*Primary Examiner* — Jerrah Edwards
*Assistant Examiner* — Tamara Weber
(74) *Attorney, Agent, or Firm* — Kenyon & Kenyon LLP

(57) ABSTRACT

A separation controller for motor vehicles, having a localization device for measuring separations from preceding vehicles, an actuator system for intervention in the longitudinal guidance of the own vehicle, and an electronic control device for applying control to the actuator system and for regulating to a target separation the separation from a preceding vehicle in the own lane, wherein the control device has an adjacent-lane mode in which the target separation is modified as a function of a measured separation from a vehicle driving in an adjacent lane.

5 Claims, 3 Drawing Sheets

SEPARATION CONTROLLER FOR MOTOR VEHICLES

RELATED APPLICATION INFORMATION

The present application claims priority to and the benefit of German patent application no. 10 2013 214 308.7, which was filed in Germany on Jul. 22, 2013, the disclosure of which is incorporated herein by reference.

FIELD OF THE INVENTION

The present invention relates to a separation controller for motor vehicles, having a localization device for measuring separations from preceding vehicles, an actuator system for intervention in the longitudinal guidance of the own vehicle, and an electronic control device for applying control to the actuator system and for regulating to a target separation the separation from a preceding vehicle in the own lane.

BACKGROUND INFORMATION

With at least certain separation controllers, the target separation may be varied as a function of speed in such a way that the own vehicle follows the preceding vehicle with a fixed time separation in time. This separation in time, called a "time gap," is usually definable by the user within certain limits.

SUMMARY OF THE INVENTION

An object of the invention is to create a separation controller that, especially in a context of narrowed roadways, enables increased driving convenience and increased driving safety.

This object may be achieved in that the control device has an adjacent-lane mode in which the target separation is modified as a function of a measured separation from a vehicle driving in an adjacent lane.

Narrowed roadways can exist on multi-lane roads. In the region of construction sites, for example, the width of the left and optionally the center travel lanes is often reduced. This results in appreciably decreased lateral separations between vehicles driving next to one another. An extended period of very closely spaced driving requires a great deal of attention from drivers. This results in rapid fatigue and can thus increase the risk of an accident. Such situations are often also perceived by occupants on the passenger side as threatening and unpleasant, especially when driving next to a truck.

The invention offers the capability of switching over to the adjacent-lane mode under such conditions, with the consequence either that the target separation from the preceding vehicle in the own lane is increased sufficiently that the own vehicle remains behind the vehicle driving in the adjacent lane or, if the separation between the vehicles in the own lane and in the adjacent lane is sufficiently large, the target separation is selected so that the own vehicle is driving not alongside, but at an offset in front of the vehicle driving in the adjacent lane. The period of time during which the own vehicle is driving next to a vehicle in the adjacent lane can thereby be considerably shortened, so that the stress and impaired comfort of the driver and the other vehicle occupants is decreased.

Advantageous embodiments and refinements of the invention are evident from the dependent claims.

The separation controller may be capable of detecting, with the aid of an infrastructure sensor suite, whether the lane in which the own vehicle is driving is narrowed. When a narrowed roadway is ascertained, the separation controller switches automatically into the adjacent-lane mode.

The adjacent-lane mode may be activatable, however, only on condition that the speed of the own vehicle is above a specific minimum value. This prevents the vehicle-to-vehicle separations from becoming unnecessarily increased when driving at very low speeds, for example in traffic jams.

The localization device will generally be a radar sensor that is capable of measuring not only the separations from but also the relative speeds of the preceding vehicles. Based on these data, the separation controller can then calculate how much time it would take to pass the vehicle driving in the adjacent lane. If the predicted duration of the passing maneuver is longer than a defined maximum duration, the separation controller decides in the adjacent-lane mode that the passing maneuver is not initiated until the separation between the preceding vehicle in the own lane and the vehicle in the adjacent lane has assumed a value such that the passing maneuver can be completed without causing the separation from the preceding vehicle in the own lane to fall below a specific minimum value.

An exemplifying embodiment will be explained in further detail below with reference to the drawings.

DETAILED DESCRIPTION

Figure 1:
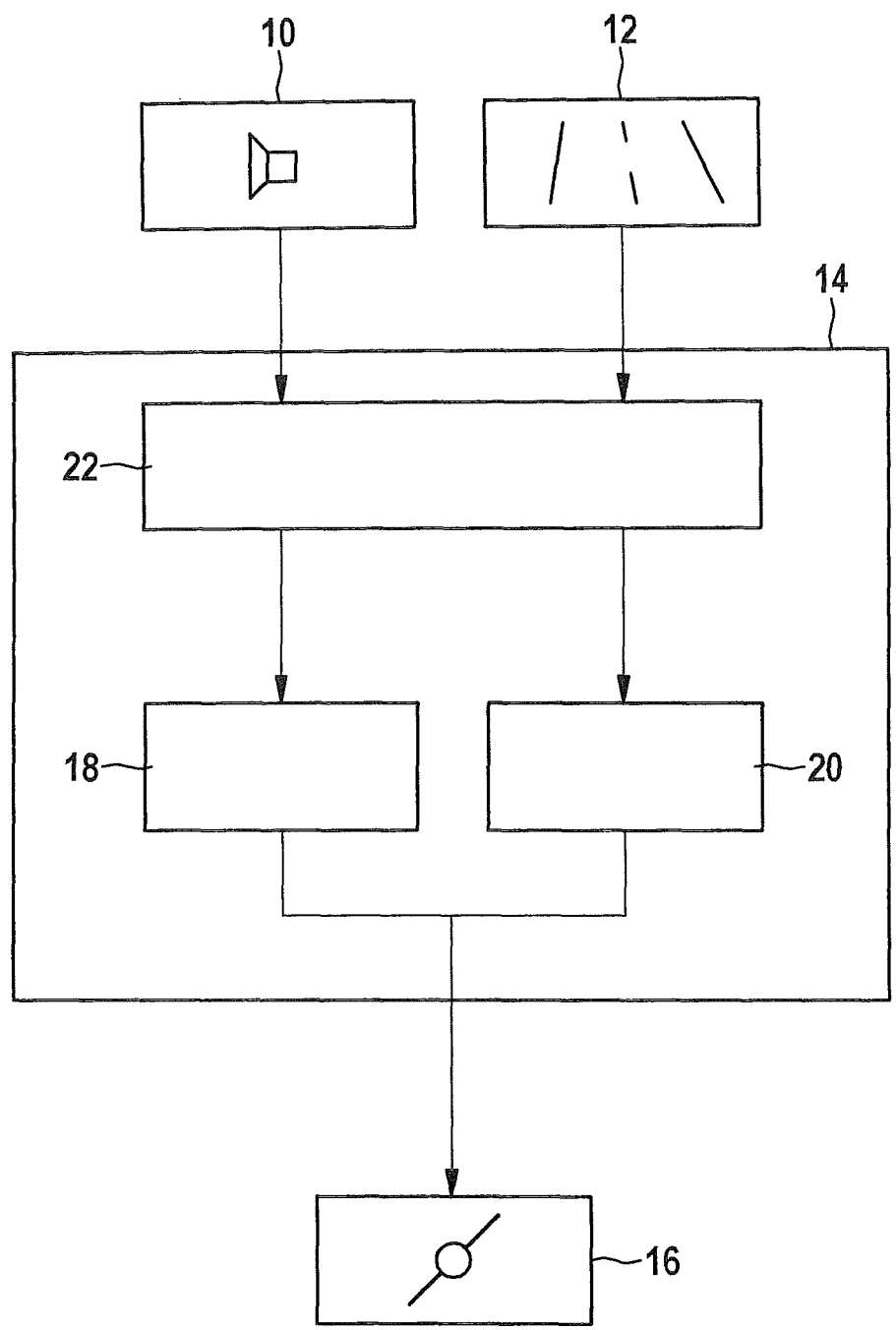
FIG. 1 is a block diagram of a separation controller according to the present invention.

The separation controller for a motor vehicle which is shown in FIG. 1 has a localization device 10, for example a radar sensor, that is installed in the vehicle at the front and serves to measure separations from and relative speeds of vehicles that are preceding in the own lane or in an adjacent lane.

Also present is an infrastructure sensor suite 12 that permits the width of the travel lane being traveled in by the own vehicle to be detected. This infrastructure sensor suite can be constituted, for example, by a video-evaluation and image-evaluation system that is capable of detecting lane markings on the roadway. Electively or additionally, however, the infrastructure sensor suite can also contain a navigation and communication system with which it is possible to ascertain whether the own vehicle is traveling at the time through a construction zone, in which usually the left lane or, when there are three lanes of travel in one direction, the center lane and the left lane, are narrowed. Because localization device 10 has a certain angular resolution capability, it is furthermore possible to ascertain whether an adjacent right lane (in countries that drive on the right), in which vehicles are traveling in the same direction, is present.

It is then possible to conclude therefrom that the own vehicle is driving in the narrowed left or center lane. The reduced lane width can also be detected by measuring, with sensors mounted laterally on the vehicle or directed toward the side, the average separation from vehicles being passed in the adjacent lanes. If this separation is below a threshold value for a certain time or for a specific number of vehicles, a lane narrowing is detected. Conversely, a normal lane width is detected when the average lateral separation of a certain number of vehicles passing by exceeds a threshold value. Both the number of vehicles passing by, and the threshold values of the narrowed or normal width of the adjacent lane, can differ from one another.

The data of localization device 10 and of infrastructure sensor suite 12 are transmitted to an electronic control device 14 that is constituted, for example, by one or more microprocessors and that further evaluates the data. As a function of the evaluation result, control device 14 applies control to an actuator system 16 that intervenes in the drive system and/or braking system of the own vehicle and thereby influences the longitudinal guidance of the own vehicle, i.e. its speed and acceleration.

Two different operating modes are implemented in control device 14, namely a normal mode 18 and an adjacent-lane mode 20. A decision unit 22 decides, on the basis of the data supplied by localization device 10 and by infrastructure sensor suite 12, as to which of the two modes the separation controller will be operated in. If the data supplied by the sensor suite indicate that the lane being traveled in by the own vehicle has at least a certain width that corresponds to a normal travel lane width, the controller operates in normal mode 18. In this mode the interventions in the longitudinal guidance system are controlled so that when a preceding vehicle is present in the own lane, that vehicle is followed with a separation in time (time gap) definable by the user. In other words, the separation from the preceding vehicle is regulated to a target separation Ds that is determined by the speed V of the own vehicle and the time gap τ selected by the user (Ds=V*τ).

Conversely, if decision unit 22 ascertains that the own vehicle is driving in a narrowed lane, the separation controller then is operated in adjacent-lane mode 20.

The behavior of the separation controller will be illustrated below with reference to FIGS. 2 to 4.

Figure 2:
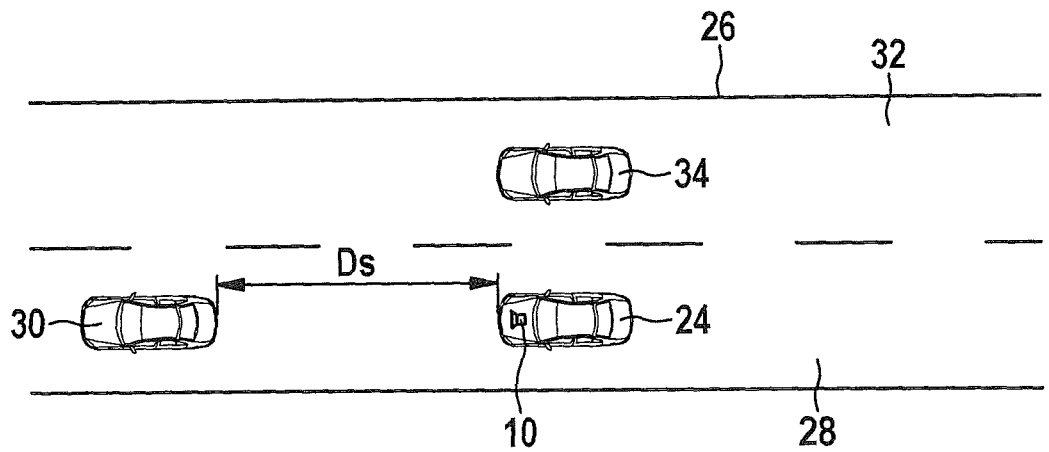
FIGS. 2, 3 and 4 show driving situations to illustrate the manner of operation of the separation controller.

FIG. 2 shows the outline of a vehicle 24 that is equipped with the separation controller according to the present invention and will be referred to hereinafter as the "own vehicle." Localization device 10 is depicted symbolically in the front portion of vehicle 24. Own vehicle 24 is driving on a two-lane single-direction highway 26 in a left lane 28 that has a normal width. Also present in left lane 28 is a preceding vehicle 30 that is being localized by the radar sensor of own vehicle 24. The separation controller is operating in normal mode 18 and intervenes in the longitudinal guidance of own vehicle 24 in such a way that the latter maintains, with respect to preceding vehicle 30, the target separation Ds determined by the time gap.

Driving in an adjacent (right) lane 32 is a further vehicle 34 that is approximately even with own vehicle 24. Vehicles 30 and 34 are traveling at approximately the same speed, so that operation of the separation controller in the normal mode causes own vehicle 24 to drive for an extended time alongside vehicle 34. Because lane 28 has a normal width, however, this situation is as a rule not perceived by the occupants of own vehicle 24 as unsettling or hazardous.

Figure 3:
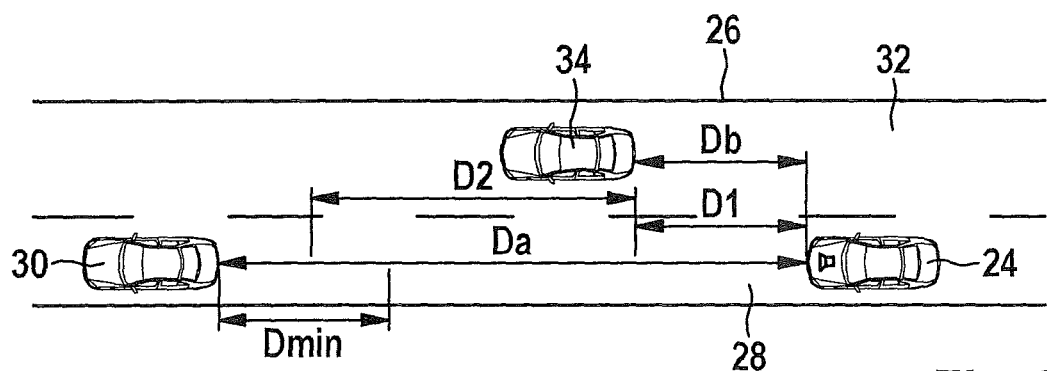

FIG. 3, on the other hand, illustrates a situation in which lanes 28 and 32 of roadway 26 are narrowed, as is often the case at construction sites. The width in particular of left lane 28 being traveled in by own vehicle 24 is appreciably reduced.

Own vehicle 24 is in this case still located behind vehicle 34 driving in adjacent right lane 32, so that this vehicle 34 can be localized by the radar sensor of the separation controller. The radar sensor likewise localizes preceding vehicle 30 in the own lane.

Decision unit 22 has detected that lane 28 being traveled in by own vehicle 24 is narrowed, and has therefore switched the separation controller into adjacent-lane mode 20. Even in this adjacent-lane mode, however, initially the same target separation Ds as in the normal mode applies.

It will be assumed now that the speed of preceding vehicle 30 is only very slightly higher than that of vehicle 34 traveling in adjacent lane 32. The measured separation Da between own vehicle 24 and preceding vehicle 30 is greater than target separation Ds. In the normal mode, own vehicle 34 would therefore initially maintain a relatively high speed and move closer to preceding vehicle 30.

In the adjacent-lane mode, decision unit 22 calculates, on the basis of the measured separation Db between own vehicle 24 and vehicle 34 traveling in the adjacent lane, and on the basis of the measured relative speeds of vehicles 30 and 34, the predicted duration T of a passing maneuver, i.e. the predicted time required for own vehicle 24 to pass vehicle 34 and to be located entirely in front of vehicle 34. Consideration is given here to the fact that own vehicle 24 cannot approach closer to preceding vehicle 30 than the target separation Ds, or in any event closer than a predefined minimum separation Dmin. But because vehicle 30 is not much faster than vehicle 34, the duration T of the passing maneuver would be comparatively long, and own vehicle 34 would need to drive for a correspondingly long time approximately even with vehicle 34. To avoid this, in the situation shown in FIG. 3 the target separation Ds is increased sufficiently that own vehicle 24 remains behind vehicle 34 driving in the adjacent lane, and comes no closer to it than a defined separation D1: Ds=Da−Db+D1. FIG. 3 illustrates the situation in which own vehicle 24 is following vehicle 34 with this separation D1.

This control behavior prevents vehicles 24 and 34 from driving alongside one another. At the same time, merging according to the "zipper" principle is facilitated upon a changeover to single-lane traffic. It is useful for this purpose if the adjacent-lane mode is implemented not only for the adjacent right lane but also (in the context of the vehicles being passed) for the adjacent left lane.

Figure 4:
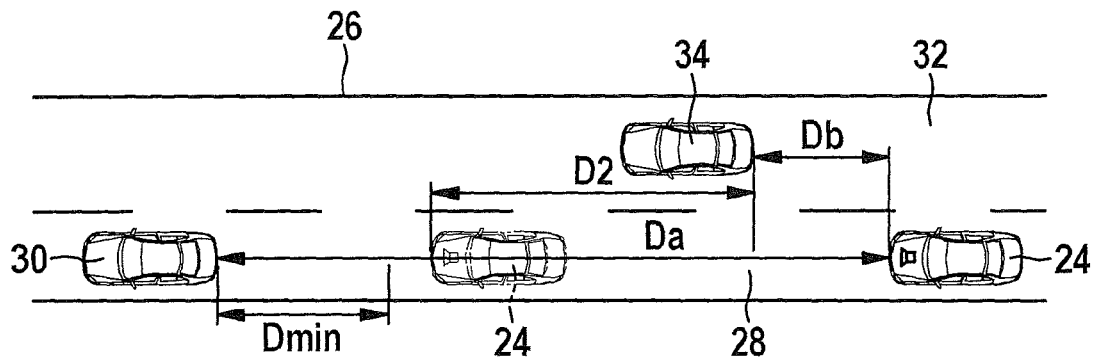

FIG. 4 illustrates the situation at a later point in time at which vehicle 30 has moved farther away from vehicle 34 driving in the adjacent lane, thereby producing between these two vehicles a gap of sufficient size in which own vehicle 24 could safely drive without being located next to vehicle 34. This means quantitatively that the separation Da between own vehicle 24 and preceding vehicle 30 is greater than the sum of the minimum separation Dmin, the separation Db from vehicle 34 in the adjacent lane, and a specific separation D2.

This separation D2 is predefined, and is somewhat greater than two typical vehicle lengths. When the separation between the rear edge of vehicle 34 and the front edge of own vehicle 24 is equal to D2, as drawn with dashed lines in FIG. 4, own vehicle 24 has therefore completely passed vehicle 34 and is no longer located alongside vehicle 34.

If the separation Da meets the aforesaid condition, the separation controller decides in the adjacent-lane mode that vehicle 34 can be safely passed. Own vehicle 24 is thus accelerated so that it passes vehicle 34 and is located alongside vehicle 34 for only a relatively short time. Own vehicle 24 is then decelerated again so that it is following preceding vehicle 30 with a safe separation. Optionally, the separation can temporarily drop below the value of the target separation Ds applicable to the normal mode, but not below the minimum separation Dmin. If preceding vehicle 30 again moves farther away from vehicle 34, own vehicle 24 can revert back to the "normal" target separation Ds.

If only a forward-directed localization device is present, it is understood that the separation Db between own vehicle 24 and vehicle 34 in the adjacent lane can be measured only as long as own vehicle 24 is still located behind vehicle 34. During the passing maneuver, vehicle 34 will therefore eventually disappear from the radar lobe of localization device 10. Assuming the speeds of the vehicles involved are constant, however, the location of vehicle 34 can still be estimated.

Figure 5:
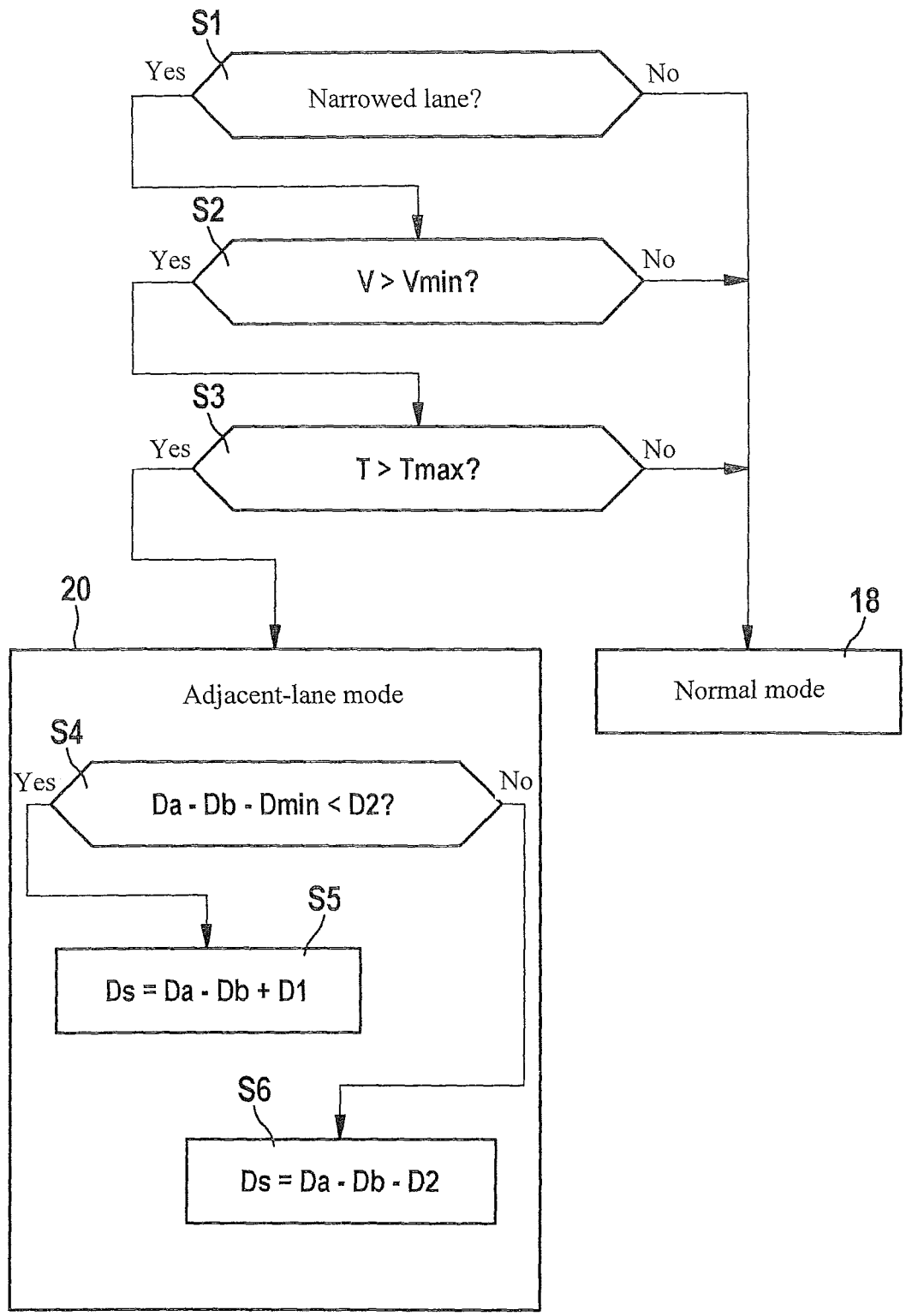
FIG. 5 is a flow chart to explain the functioning of the separation controller.

FIG. 5 presents the manner of operation of the separation controller in a flow chart.

At regular time intervals, a step S1 checks whether lane 28 being traveled in by own vehicle 24 is narrowed, and whether an adjacent lane 32, in which vehicles are traveling in the same direction, is present. As long as this is not the case, the separation controller remains in normal mode 18. If lane narrowing is ascertained, step S2 then checks whether the speed V of the own vehicle is greater than a specific minimum value Vmin, which can be e.g. 30 or 40 km/h. If not, decision unit 22 selects normal mode 18. This prevents the vehicles in the two lanes from driving with an offset from one another even at very low speed, for example stop-and-go traffic, with unnecessarily large separations that would cause an extension of the traffic jam.

If the speed is greater than Vmin and if a vehicle 34 is present in adjacent lane 32, step S3 checks whether the predicted duration T of a passing maneuver in which vehicle 34 is passed would be greater than a specific maximum value Tmax. If T is less than Tmax, vehicle 34 can be passed relatively quickly, and the time span during which vehicles 24 and 34 are driving alongside one another is correspondingly short and therefore acceptable. In this case the separation controller remains in normal mode 18.

If T is greater than Tmax, however, a longer period of driving alongside each other is avoided by the fact that decision unit 22 switches into adjacent-lane mode 20. In this mode, in step S4 the condition Da−Db−Dmin<D2 is tested. If this condition is met, this means that there is not sufficient space between vehicles 30 and 34 to allow vehicle 34 to be completely passed while nevertheless allowing the minimum separation Dmin from vehicle 30 to be maintained. This corresponds to the situation illustrated in FIG. 3. In this case, in step S5 the target separation Ds is set to Da−Db+D1.

If the condition tested in step S4 is not met, however, then in step S6 the target separation Ds is set to Da−Db−D2. This corresponds approximately to the position drawn with dashed lines in FIG. 4. Own vehicle 24 passes vehicle 34 and follows preceding vehicle 30 with the separation Dmin. Because the beginning of the passing maneuver cannot clearly be predicted to the driver when the speed difference between vehicles 24 and 30 is small, an optical, acoustic, or haptic signal can be delivered to the driver before acceleration begins.

The minimum separation Dmin can correspond to the "normal" target separation Ds in normal mode, but electively can also be somewhat smaller. In the latter case the target separation is then gradually increased from Dmin to the target separation applicable to the normal mode. The rate at which this occurs can depend on the speed difference between vehicles 30 and 34.

In another embodiment, Dmin is identical to the target separation applicable in the normal mode, but when the condition is tested in step S4, the instantaneous value of the difference Da−Db is not utilized but instead that value is extrapolated into the future, based on the speed difference between vehicles 30 and 34, over a time span that corresponds to the duration T of the passing maneuver. The passing maneuver can therefore begin already at a somewhat earlier point in time while nevertheless ensuring that the target separation from preceding vehicle 30 does not fall below the usual value. The exemplifying embodiment described above can be modified in a variety of ways. For example, detection of multiple vehicles in an adjacent lane or in multiple adjacent lanes can also be used, for example in order also to estimate the speed of vehicle 34 while passing and/or to estimate the size of the gap between the vehicles and to check whether it is large enough.

With a suitable sensor suite, the length or at least the class (large truck, small truck, passenger car) of the vehicle to be passed can also be measured so that this value can be used as a basis for determining the dimension D2.

An additional sensor can also be installed which checks whether the vehicle to be passed has been completely passed, or whether its front edge has been reached.

The driver can also be offered the option of manually switching into the adjacent-lane mode or normal mode.

What is claimed is:

1. A separation controller for motor vehicles, comprising:
a localization device to measure separations from preceding vehicles;
an actuator system to intervene in the longitudinal guidance of the own vehicle; and
an electronic control device to apply control to the actuator system and to regulate to a target separation the separation from a preceding vehicle in the own lane, wherein the control device includes an adjacent-lane mode in which the target separation between the own vehicle and the preceding vehicle in the own lane is modified as a function of a measured separation of the own vehicle in the direction of travel of the own vehicle from a vehicle driving in an adjacent lane, wherein the target separation is increased, with respect to a target separation applicable in a normal mode, when the difference between (i) the separation of the own vehicle from the preceding vehicle in the own lane and (ii) the separation of the own vehicle in the direction of travel of the own vehicle from the vehicle driving in the adjacent lane, is less than a defined value.

2. The separation controller of claim 1, wherein the defined value for the separation difference depends on the difference in speed between the preceding vehicle in the own lane and the vehicle driving in the adjacent lane.

3. The separation controller of claim 1, further comprising:
an infrastructure sensor suite to detect a narrowing of the lane being traveled in by the own vehicle;
wherein the control device is configured to perform an automatic switchover into the adjacent-lane mode when a narrowing of the lane is ascertained.

4. The separation controller of claim 3, wherein the control device does not perform an automatic switchover into the adjacent-lane mode as long as the speed of the own vehicle is lower than a defined minimum value.

5. The separation controller of claim 1, wherein the control device is configured, upon localization of a vehicle driving in the adjacent lane, to calculate the predicted duration of a passing maneuver in which the vehicle is passed in consideration of the speed of the vehicle and the speed of the preceding vehicle in the own lane, and to switch into the adjacent-lane mode if the predicted duration is greater than a defined maximum value.

* * * * *